Figure 1:
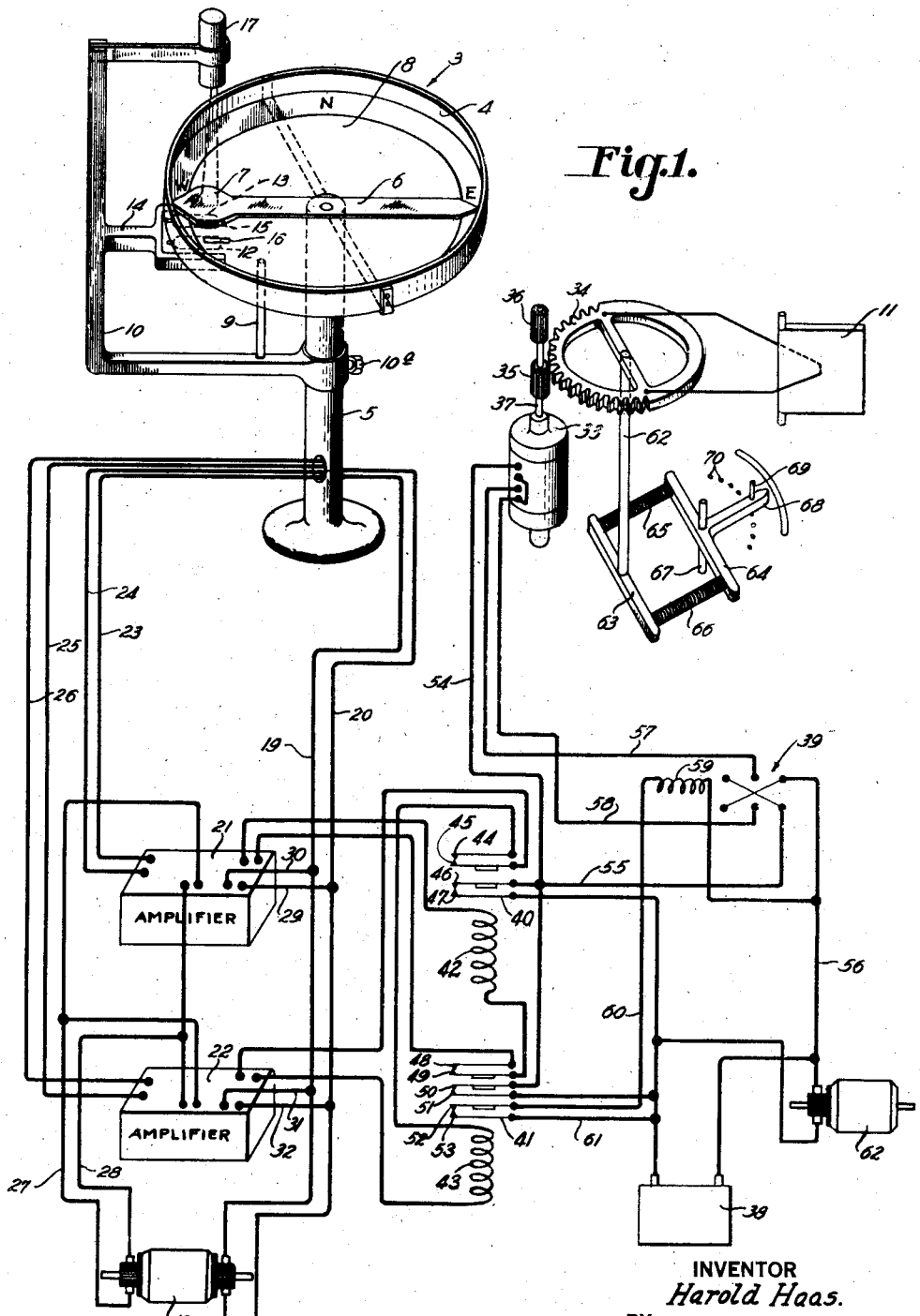

Aug. 23, 1932.  H. HAAS  1,873,579
AIRCRAFT CONTROL APPARATUS
Filed May 4, 1931  2 Sheets-Sheet 1

INVENTOR
*Harold Haas.*
BY
*F. B. Smith*
ATTORNEY

Aug. 23, 1932.  H. HAAS  1,873,579
AIRCRAFT CONTROL APPARATUS
Filed May 4, 1931   2 Sheets-Sheet 2
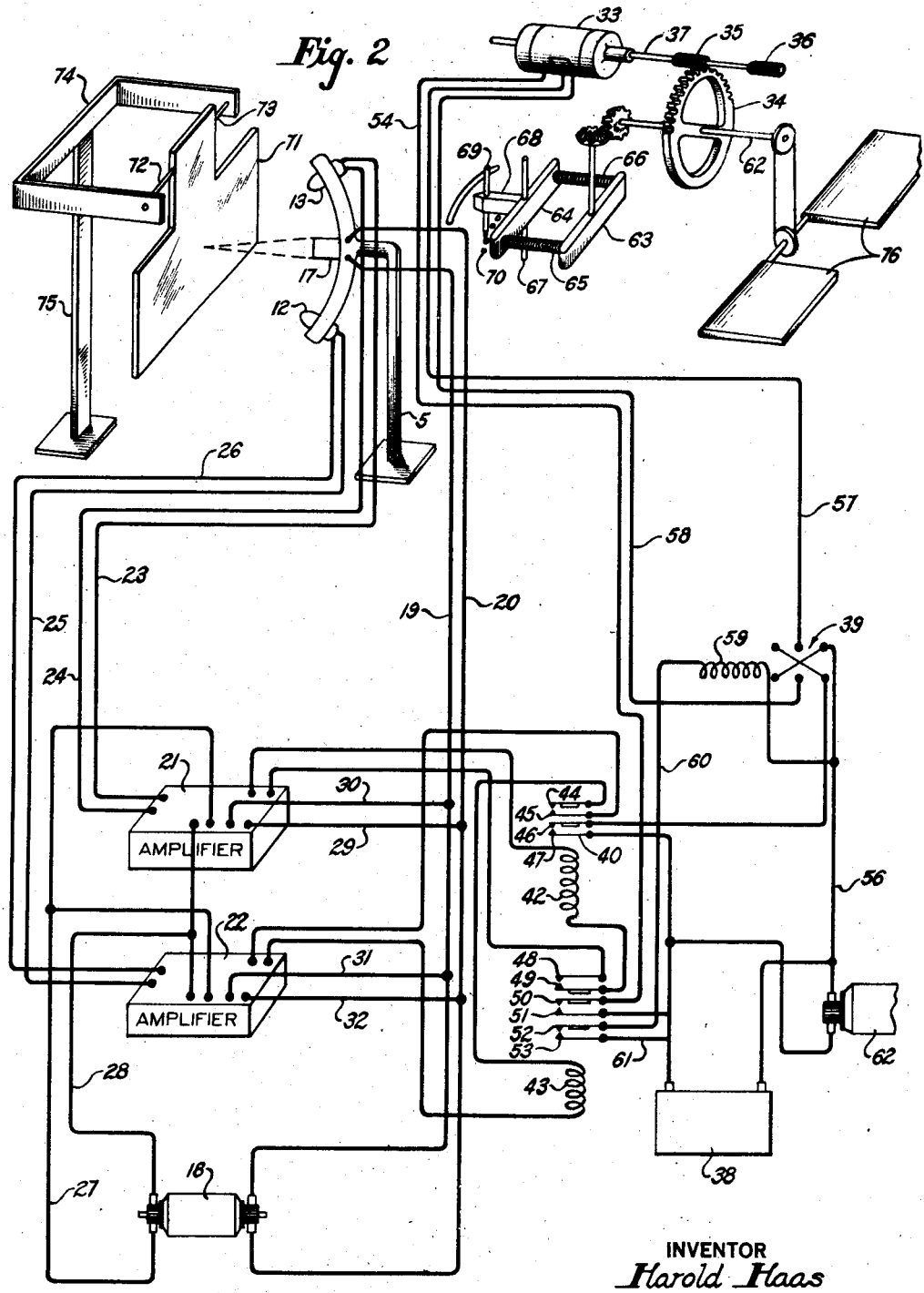
INVENTOR
*Harold Haas*
BY
*F. B. Smith*
ATTORNEY Patented Aug. 23, 1932

1,873,579

UNITED STATES PATENT OFFICE

HAROLD HAAS, OF ARLINGTON, NEW JERSEY, ASSIGNOR TO BENDIX RESEARCH CORPORATION, OF EAST ORANGE, NEW JERSEY, A CORPORATION OF INDIANA

AIRCRAFT CONTROL APPARATUS

Application filed May 4, 1931. Serial No. 535,052.

The present invention relates to navigational control apparatus and more particularly to means for maintaining the stability of a mobile object.

One of the objects of the invention is to provide novel means for controlling and maintaining the stability of a mobile object about any one or all of its three axes.

Another object is to provide novel means whereby a mobile object, as for example a ship or aircraft, is maintained on a predetermined path or course.

Another object is to provide novel electrical means whereby a mobile object is returned to a predetermined path or course when it departs therefrom.

Another object is to provide in combination with a control member of a mobile object for controlling the latter, and means for actuating said control member, novel means adapted to be energized upon motion of the mobile object about one of its axes for rendering said actuating means operative, whereby said object is returned to normal position.

Another object of the invention is to provide in combination with a control member of a mobile object for controlling the stability of the latter with respect to one of its axes, novel electrical apparatus including light responsive means and means for actuating the control member upon energization of said light responsive means when said object is disturbed about the axis about which it is controlled, whereby the object is restored to normal position.

A further object is to provide novel electrical apparatus including light responsive means for operating electrical circuits in accordance with the angular deviation of a mobile object carrying said apparatus from a predetermined path or course whereby said object is returned to said path or course.

Another object is to provide a novel electrical control system for maintaining a mobile object on a predetermined path or course, which system is so designed as to depend for operation upon an electric current produced by changes in relative position between a directional device and light responsive means due to a deviation of the mobile object from its predetermined path or course.

Another object of the invention is to provide in combination with a directional or controlling device such as a magnetic compass, a novel electrical control system including light responsive means for maintaining a mobile object, on which the directional device is mounted, on a predetermined path or course and adapted to be operated upon relative angular movement between the directional device and the mobile object, whereby the latter is returned to its path or course.

A still further object is to provide in combination with a control member of a mobile object and a directional device carried by the latter, apparatus including light responsive means for causing actuation of the control member when the mobile object deviates from a predetermined path or course, and novel means for returning the control member to its initial position after the mobile object has returned to its predetermined course, whereby over-swinging of the mobile object is prevented.

Still another object is to provide in combination with a mobile object, means responsive to the inclination of said object from a level condition, and novel means cooperating with and rendered effective by said last mentioned means upon such inclination of said mobile object for restoring the level condition of the latter.

The above and other objects and advantages of the invention will appear more fully hereinafter from a consideration of the detailed description which follows, taken together with the accompanying drawings wherein two embodiments of the invention are illustrated. It is to be expressly understood, however, that the drawings are for the purpose of illustration and description only and are not designed as a definition of the limits of the invention, reference being had for this purpose to the appended claims.

In the drawings, wherein like reference characters refer to like parts in the two views, Fig. 1 is a diagrammatic view illustrating the electrical circuit arrangement of one embodiment of the invention as employed for directional stabilization of a mobile object; and Fig. 2 is similar to that of Fig. 1 illustrating another embodiment of the invention as employed for stabilization of an aircraft about its transverse axis.

The apparatus embodying the present invention, when employed to maintain a mobile object on a predetermined course, comprises a directional device, such as for example, a magnetic compass adapted to be carried by the mobile object which is to be maintained on a predetermined path or course, means for operating a control member of the mobile object, as for example the rudder thereof, means effective upon relative movement between the directional device and the mobile object for causing energization of the control member actuating means whereby the mobile object is returned to its course, and means for restoring the control member or rudder to its initial position after the mobile object has returned to its course, whereby over-swinging is prevented.

Referring to Fig. 1 of the drawings, in the form shown therein, the apparatus comprises a turn responsive or directional device 3 which in the present instance is shown as a magnetic compass, although a gyroscopic turn indicator may be employed in the place thereof. The compass is constituted by a circular frame 4 mounted on a support 5 which is adapted to be secured to and moved with the mobile object which is to be controlled. Pivotally mounted in the frame 4 is a directional element 6, as for example a magnetic compass needle which has its north end enlarged, as indicated at 7, for a purpose which will appear more fully hereinafter. The bottom of the frame 4 is cut out to form a circular disc 8, the latter being arranged to be rotatably adjusted relative to the frame 4 by means of a rod 9 to which the disc is secured. The rod 9 is carried by a bracket 10 adjustably secured to the support 5 and capable of rotation through 360 degrees about the latter by loosening the set screw 10a.

Novel means are provided whereby upon deviation of the mobile object from a predetermined path or course, a control member of said object, such as the rudder 11, is arranged to be actuated to return the object to said course and includes a light responsive or photo-electric system which is rendered effective upon such deviation to control said rudder. In the form shown, the means last referred to comprise a pair of selenium or photo-electric cells 12 and 13 which are carried by an arm 14 secured to or formed integral with the bracket 10, and which projects under the frame 4 so that the selenium cells are directly below a pair of apertures or slits 15 and 16 formed in the disc 8 near its periphery. A source of light 17, as for example an electric light bulb, is also carried by the bracket 10 and positioned above the frame 4 so that the light emitted therefrom may pass through the slits 15 and 16 and onto the photo-electric cells 13 and 14 when the enlarged portion 7 of the compass needle 6 moves angularly relative to the frame 4 due to deviation of the mobile object from its course.

The course of the mobile object may be selected or predetermined by rotating the bracket 10 relative to the frame 4 and support 5 until the source of light 17 and the apertures 12 and 13 are in a position corresponding to the compass direction in which it is desired to pilot the mobile object.

The source of light 17 is arranged to be energized from the low potential side of a double voltage generator 18 through the electrical conductors 19 and 20 and connected to said light source in any suitable manner (not shown) through the support 5 and bracket 10. The selenium or photo-electric cells 12 and 13 are normally inoperative but arranged so that upon deviation of the mobile object to the left, for example, the slit or aperture 16 will be uncovered first, thereby energizing the cell 12, and upon a deviation of the mobile object to the right, the aperture 15 will be uncovered first, thereby energizing the cell 13.

Upon energization of either of the selenium cells, an electric current is caused to flow, as is well known in the art, and which may be amplified by suitable electric amplifiers 21 and 22, each of which is connected to the selenium cells by means of conductors 23, 24, and 25, 26 respectively. The amplifiers are preferably of the vacuum tube type, the tubes of which are supplied with suitable plate potentials from the high potential side of the generator 18 by means of the leads 27 and 28. The cathodes of the vacuum tubes of each of the amplifiers are arranged to be heated by current from the low potential side of the generator 18 and for this reason are connected to the leads 19 and 20 by means of the leads 29, 30, and 31, 32.

Means are now provided whereby upon energization of one of the photo-electric cells, the control member of rudder 11 of the mobile object is arranged to be actuated in one direction, and upon energization of the other photo-electric cell, said rudder is actuated in the opposite direction. In the embodiment illustrated, said means comprise an electric motor 33 adapted to be drivably connected to a gear wheel 34 by means of a double "Bendix drive" which is constituted by pinions 35 and 36 which are arranged to be moved longitudinally along the shaft 37. Pinions 35 and 36 are threaded on the shaft 37 in such a manner that when the motor armature rotates in one direction, pinion 35 will mesh with the gear 34, and when rotated in the opposite direction pinion 36 will mesh with the gear 34.

Motor 33 is adapted to be energized from a suitable source of electrical energy, as for example a battery 38 through a field reversing relay 39, the operation of which will appear hereafter. Energization of the electric motor 33 is accomplished by means of a pair of relays 40 and 41 which include solenoid windings 42 and 43 respectively. Associated with the winding 42 are a pair of normally closed electrical contacts 44 and 45 and a pair of normally open contacts 46 and 47, and associated with the winding 43 is a similar pair of normally closed contacts 48 and 49 and two pair of normally open contacts 50, 51 and 52, 53. Contacts 44 and 45 are connected in series with the winding 43 and the output of the amplifier 22, while contacts 48 and 49 are connected in series with the winding 42 and the output of the amplifier 21. Contacts 46 and 50 are connected to the armature of the motor 33 through lead 54 and to the field reversing relay through the lead 55. Contacts 47 and 51 are connected to one terminal of the source 38 while the other terminal of the latter is connected to the other terminal of the armature and to the field of the motor through the reverse current relay 39 by means of the lead 56 and leads 57 and 58. Contacts 52 and 53 are connected in series with a winding 59 of the field reversing relay 39 and the source 38 by means of the leads 60, 56 and 61. The battery 38 may be charged by means of a generator 62 which may be driven by any suitable prime mover, as for example a wind motor or an internal combustion engine when the apparatus is employed on an aircraft, or by an electric motor when employed on a ship. The generator 18 may also be operated in the same manner.

The field reversing relay 39 is of the usual type and arranged so that upon energization of the winding 59 one pair of contacts is closed and current from the source 38 flows through the field of the motor 33 in one direction, but when the winding 59 is de-energized, as when the relay 43 is inoperative, a spring (not shown) closes the opposite pair of contacts of the relay so that current from the source 38 flows through the motor 33 in the opposite direction.

It will be apparent from the foregoing circuit arrangement, that upon deviation of the mobile object to the left, for example, the photo-electric cell 12 will become energized thereby producing a current flow through the amplifier 21 and the current thus amplified will energize the winding 42 of the relay 40. Upon energization of the winding 42, contacts 46 and 47 which are normally open, are then closed, and contacts 44 and 45 which are normally closed, are opened. The opening of the latter pair of contacts renders the solenoid 43 ineffective, and the closing of the contacts 46 and 47 causes energization of the motor 33 through the field reversing relay 39, whereupon the motor is rotated in one direction thereby meshing the pinion 35 with the gear 34 which in turn actuates the rudder 11 to bring the mobile object back on its course. If the deviation of the mobile object is so great that the enlarged portion 7 of the compass needle 6 is moved to such an extent relative to the frame 4 that both photo-electric cells 12 and 13 are energized, the current produced by the one which is uncovered last will be ineffective by virtue of the fact that the relay winding 43 is open circuited by the opening of the contacts 44 and 45 due to the energization of the winding 42 which is energized ahead of the winding 43 because of the photo-electric cell 12 being energized prior to the photo-electric cell 13. On the other hand, if the mobile object deviates to the right, then the cell 13 will be uncovered first and the electric current produced thereby will be amplified in the amplifier 22 and cause the energization of the winding 43 of the relay 41. Upon energization of the latter winding, contacts 48 and 49 will be opened thereby rendering relay winding 42 ineffective and contacts 50, 51 and 52, 53 will be closed. Upon closing of contacts 52 and 53, relay winding 59 will become energized, thereby actuating the field reversing relay 39 so that the flow of current through the field of the motor 33 will be in the opposite direction to produce reverse rotation of said motor when contacts 50 and 51 are closed simultaneously with contacts 52 and 53. Since the motor armature 33 is rotated in a direction opposite to that in which it was moved when the mobile object deviated to the left, the pinion 36 will now mesh with the gear 34, thereby actuating the rudder 11 in the opposite direction to bring the mobile object back on its course.

Novel means are also provided for returning the control member or rudder 11 to normal position after the mobile object has returned to its course, and in the form shown, comprise a mechanism which is drivably connected to the gear 34 by means of a shaft 62, and which is constituted by a pair of spaced parallel arms 63 and 64, the ends of which are connected together by means of a pair of compression springs 65 and 66. The shaft 62 is secured to or formed integral with the arm 63, while the arm 64 is adjustably secured to the mobile object in any suitable manner, as by means of a stub shaft 67 and arranged to be adjusted by moving the arm 68 about the shaft 67 and locking it in the adjusted position by means of a pin 69 arranged to pass through the arm 68 into any one of a series of holes 70. It will be apparent that when the gear 34 is actuated to move the rudder 11 in either direction, the shaft 62 will rotate with the gear, thereby rotating the arm 63 so that one of the springs 65 and 66 is compressed while the other is put under tension because of the fixed position of the arm 64. As soon as the mobile object returns to its course, the enlarged portion 7 of the compass needle 6 covers both of the apertures 15 and 16, thereby rendering both photo-electric cells ineffective and also the motor 33. When the motor 33 ceases to operate, the pinions 35 and 36 are disengaged from the gear 34 in the usual manner of a Bendix drive, and the springs 65 and 66 cause the arm 63 to return to normal position which in turn restores the control member or rudder 11 to normal position by rotating the gear 34 back to its initial position. By removing the pin 69 and adjusting the arm 68, the control member or rudder 11 may be set at a predetermined angle to the longitudinal axis of the mobile object so that a certain amount of right or left rudder may be maintained to compensate for the effect of wind drift in the case of aircraft, or for the effect of undercurrents in the case of a ship.

Referring to Fig. 2 there is disclosed another embodiment of the invention in which the electrical circuit arrangement is identical with that shown in Fig. 1 except that the apparatus is arranged to be rendered operative in response to longitudinal inclinations of the mobile object and particularly adapted for use on aircraft. In the form illustrated in this embodiment, the photo-electric cells 12 and 13 are arranged to be energized by means of a light beam projected from source 17 and reflected by means of a pendulously suspended mirrored surface 71 which is pivotally mounted in jeweled bearings 72 and 73 carried by frame 74 mounted on a support 75 which is secured to the aircraft in such a manner that the mirrored surface 71 will be inclined relative to photo-electric cells 12 and 13 upon an inclination of the craft upward or downward. It is apparent from this arrangement that upon a downward inclination of the craft the mirrored surface 71 will swing into such a position that the light beam from the source 17 will be reflected onto the cell 12 and upon an upward inclination of the craft, said light beam will be reflected on to the cell 13 so that a horizontal rudder 76 will be actuated up or down to restore the craft to level flight. The operation of the electrical system is the same as that of the system shown in Fig. 1, i. e., when one cell is energized, the horizontal rudder 76 will be actuated in one direction, and when the other cell is energized, the rudder 76 will be actuated in the opposite direction.

If it be desired to control the lateral inclination of aircraft, the pendulously supported mirrored surface 71 may be mounted with its axis of suspension parallel to the longitudinal axis of the craft so that said surface may swing relative to the craft when the latter inclines to the left or to the right, i. e., when the plane is banking. The electric motor 33 may then be connected in any suitable manner to actuate the ailerons of the plane for restoring the latter to level flight.

Although for the sake of simplicity, the mirror 71 is shown as a simple pendulum, it is obvious that the mirror may be mounted on the frame of a gyroscopically stabilized pendulum, whereby acceleration forces are rendered ineffective when the device is employed on an aircraft traveling at high speeds.

There is thus provided novel apparatus and a novel control system for controlling and maintaining the stability of a mobile object, as for example an aircraft, about any one or all of its axes in response to the motion of the object about said axes produced by external disturbing forces. There is also provided a novel device for restoring a control member of the mobile object to its normal position after the object has bene stabilized and which is particularly useful in maintaining the mobile object on a predetermined path or course.

The directional or turn responsive device, as for example, the compass or the pendulously suspended mirror, may be mounted in any convenient location on a ship or aircraft while the servo-motor may be conveniently mounted in the vicinity of the member which it is adapted to control.

While only two embodiments of the invention have been illustrated and described, other changes and modifications, which will now appear to those skilled in the art, may be made without departing from the scope of the invention. For example, the apertures or slits 15 and 16 may be so located in the adjustable disc 8 that the directional element 6 is directly between them, thereby exposing both slits to the light source thus maintaining both cells energized when the mobile object is on its course. In such an arrangement, the relays 40 and 41 will be energized simultaneously. By properly arranging the contacts 46 and 47, and the contacts 50, 51 and 52, 53, the circuit of the motor 33 may be energized to rotate the latter in one direction or the other when either one or the other of the cells 12 and 13 is deenergized upon relative motion between the directional element 6 and the frame 4. Reference is therefore to be had to the appended claims for a definition of the limits of the invention.

What is claimed is:

1. Apparatus for maintaining a mobile object on a predetermined path or course, comprising in combination a direction responsive device carried by said mobile object and arranged for angular motion relative thereto upon a deviation of said object from said course, a control member also carried by said mobile object, means for actuating said control member, a pair of photo-electric cells associated with said direction responsive device and adapted to be energized to produce an electric current upon deviation of said mobile object from its course, an electrical circuit arrangement including said photo-electric means, said control member actuating means, current amplifying means for each of said photo-electric cells and interconnected relays for energizing the control member actuating means so that the latter may move the control member in one direction or the other upon energization of one or the other of the photo-electric cells respectively, means connecting said relays in such a manner that when one is rendered operative ahead of the other, the latter is simultaneously rendered inoperative, and means for returning the control member to its normal position after it has been actuated to return the mobile object to its course, whereby overswinging of said object is prevented.

2. Apparatus for maintaining an aircraft in level flight comprising in combination, a control member carried by said craft, a pendulously supported mirror carried by said craft and responsive to the inclination of the latter about one of its axes, a light source associated with said mirror for directing a ray of light thereon, a pair of photo-electric cells disposed opposite the mirror, whereby the light ray is reflected onto one or the other of said cells upon the inclination of said craft in one direction or the other so that an electric current is produced, means connected to each of said cells for amplifying said current, means adapted to be energized by said amplified current, means for actuating said control member, and a source of electrical energy for energizing said actuating means, said second-mentioned means comprising a pair of relays arranged so that when one is energized first by its associated cell, the other is rendered inoperative whereby operation of both relays is prevented in the event that the second cell is energized while the first cell is operating.

3. Apparatus for maintaining an aircraft in level flight comprising in combination, a control member carried by said craft, a pendulously supported mirror carried by said craft and responsive to the inclination of the latter about one of its axes, a light source associated with said mirror for directing a ray of light thereon, a pair of photo-electric cells disposed opposite the mirror, whereby the light ray is reflected onto one or the other of said cells upon the inclination of said craft in one direction or the other so that an electric current is produced, means connected to each of said cells for amplifying said current, means adapted to be energized by said amplified current, means for actuating said control member, a source of electrical energy for energizing said actuating means, said second mentioned means comprising a pair of relays arranged so that when one is energized first by its associated cell, the other is rendered inoperative whereby operation of both relays is prevented in the event that the second cell is energized while the first cell is operating, and means effective upon restoration of the aircraft to level flight for returning the control member to its normal position.

4. Apparatus for maintaining an aircraft in level flight comprising in combination, a control member carried by said craft, a pendulously supported mirror carried by said craft and responsive to the inclination of the latter about one of its axes, a light source associated with said mirror for directing a ray of light thereon, a pair of photo-electric cells disposed opposite the mirror, whereby the light ray is reflected onto one or the other of said cells upon the inclination of said craft in one direction or the other so that an electric current is produced, means connected to each of said cells for amplifying said current, means for actuating said control member, a source of electrical energy for energizing said actuating means, said second-mentioned means comprising a pair of relays arranged so that when one is energized first by its associated cell, the other is rendered inoperative whereby operation of both relays is prevented in the event that the second cell is energized while the first cell is operating, and means effective upon restoration of the aircraft to level flight for returning the control member to its normal position, said last mentioned means including means for adjusting the control member to a predetermined normal position for counter-balancing the effect of wind drift upon said craft.

5. In apparatus for maintaining a mobile object on a predetermined path or course, the combination of a source of light, a pair of photo-electric cells, a directional device carried by said mobile object and including a plate interposed between the photo-electric cells and the light source and having a pair of apertures each of which is associated with one of the photo-electric cells, respectively, and an angularly movable member normally covering both of said apertures when the mobile object is on the predetermined path or course but arranged to uncover one or the other of said apertures upon deviation of said object from said course so that one or the other of said cells becomes energized, a control member carried by said mobile object, means associated with said control member for actuating the latter in one direction or the other upon energization of one or the other of said photo-electric cells, and means for returning said control member to normal position when the photo-electric cells are rendered inoperative upon the return of the mobile object to its course.

6. In apparatus for maintaining a mobile object on a predetermined path or course, the combination of a source of light, a pair of photo-electric cells, a direction-responsive device carried by said mobile object and including a plate having a pair of apertures associated with said cells, said plate being interposed between the light source and said photo-electric cells, and an angularly movable member arranged to normally cover both of said apertures when the mobile object is on said predetermined course but to uncover one or the other of said apertures when said object deviates in one direction or the other from said course, a control member carried by said mobile object, means for actuating said control member, an electrical circuit arrangement including said photo-electric cells and said actuating means and rendered operative upon energization of one or the other of said photo-electric cells for operating said actuating means so that the control member is moved into such a position as to return the mobile object to its predetermined course, a pair of relays also included in said circuit, means interconnecting said relays in such a manner that when one becomes operative ahead of the other the latter is simultaneously rendered inoperative, and means effective to restore the control member to its normal position after the object has returned to its course.

7. Apparatus for controlling the stability of a mobile object with respect to one of its axes comprising, in combination, means responsive to the motion of said mobile object about said axis, a source of light, a pair of photo-electric cells associated with said light source and said motion-responsive means so that one or the other of said cells becomes energized, a control member carried by said mobile object, means for actuating said control member, an electrical circuit arrangement including said photo-electric cells, said actuating means and a pair of relays for energizing said actuating means so that the latter may move the control member in one direction or the other upon energization of one or the other of the photo-electric cells, respectively, means connecting said relays in such a manner that when one is rendered operative ahead of the other the latter is simultaneously rendered inoperative, and means for returning the control member to its normal position after it has been actuated to return the mobile object to its course.

8. Apparatus for controlling the stability of a mobile object with respect to one of its axes comprising, in combination, means responsive to the motion of said mobile object about said axis, a source of light, a pair of photo-electric cells associated with said light source and said motion-responsive means so that one or the other of said cells becomes energized, a control member carried by said mobile object, means for actuating said control member, an electrical circuit arrangement including said photo-electric cells, said actuating means and a pair of relays for energizing said actuating means so that the latter may move the control member in one direction or the other upon energization of one or the other of the photo-electric cells, respectively, means connecting said relays in such a manner that when one is rendered operative ahead of the other the latter is simultaneously rendered inoperative, and means for returning the control member to its normal position after it has been actuated to return the mobile object to its course, said last mentioned means including means for adjusting the control member to a predetermined normal position for counter-balancing the effect of wind drift upon said mobile object.

9. Apparatus for controlling the stability of a mobile object with respect to one of its axes, comprising in combination, means responsive to the motion of said mobile object about said axis, a source of light, a pair of photo-electric cells associated with said light source and said motion-responsive means so that one or the other of said cells becomes energized, a control member carried by said mobile object, means for actuating said control member upon energization of said cells, and an electrical circuit arrangement including said photo-electric cells, said actuating means and means interconnecting said cells and said actuating means in such a manner that when one cell is energized the other is rendered ineffective.

10. Apparatus for controlling the stability of a mobile object with respect to one of its axes, comprising in combination, means responsive to the motion of said mobile object about said axis, a source of light, a pair of photo-electric cells associated with said light source and said motion-responsive means so that one or the other of said cells becomes energized, a control member carried by said mobile object, means for actuating said control member upon energization of said cells, an electrical circuit arrangement including said photo-electric cells, said actuating means and means interconnecting said cells and said actuating means in such a manner that when one cell is energized the other is rendered ineffective, and means for returning the control member to its normal position after it has been actuated.

In testimony whereof I have signed this specification.

HAROLD HAAS.